United States Patent
Betremieux et al.

(10) Patent No.: US 7,820,754 B2
(45) Date of Patent: Oct. 26, 2010

(54) AQUEOUS POLYMER DISPERSION FOR BARRIER COATING

(75) Inventors: Isabelle Betremieux, Coye la Forêt (FR); Baudouin Duque, Brussels (BE); Leo Saija, Bagnolo in Piano (IT)

(73) Assignee: Cray Valley S.A., Courbevoie (FR)

( * ) Notice: Subject to any disclaimer, the term of this patent is extended or adjusted under 35 U.S.C. 154(b) by 1149 days.

(21) Appl. No.: 11/071,979

(22) Filed: Mar. 4, 2005

(65) Prior Publication Data

US 2005/0256257 A1 Nov. 17, 2005

Related U.S. Application Data

(60) Provisional application No. 60/565,206, filed on Apr. 23, 2004.

(30) Foreign Application Priority Data

Mar. 10, 2004 (FR) .................................. 04 02571

(51) Int. Cl.
*C08G 63/91* (2006.01)
(52) U.S. Cl. ...................... 524/556; 524/599; 524/608; 524/606
(58) Field of Classification Search .................. 524/556, 524/599, 606, 608
See application file for complete search history.

(56) References Cited

U.S. PATENT DOCUMENTS

| | | | |
|---|---|---|---|
| 4,487,859 A | 12/1984 | Martino | |
| 5,922,410 A * | 7/1999 | Swartz et al. | 427/393 |
| 6,492,451 B1 | 12/2002 | Dersch et al. | |
| 6,756,459 B2 | 6/2004 | Larson et al. | 526/274 |
| 7,179,531 B2 * | 2/2007 | Brown et al. | 428/407 |
| 7,285,590 B2 * | 10/2007 | Holub et al. | 524/460 |
| 2004/0206274 A1 * | 10/2004 | Kruckel | 106/164.4 |

FOREIGN PATENT DOCUMENTS

| | | | |
|---|---|---|---|
| EP | 0 221 498 A2 | 5/1987 | |
| EP | 221498 A2 * | 5/1987 | |
| EP | 0305805 A2 | 3/1989 | |
| EP | 0699724 A1 | 3/1996 | |
| EP | 1193298 A1 | 4/2002 | |
| EP | 1344786 A2 | 9/2003 | |
| WO | 0174909 A2 | 10/2001 | |
| WO | WO 01/74909 A2 * | 10/2001 | |

* cited by examiner

*Primary Examiner*—Robert D. Harlan
(74) *Attorney, Agent, or Firm*—Whyte Hirschboeck Dudek SC

(57) ABSTRACT

The invention relates to an aqueous polymer dispersion which can be obtained from a mixture of monomers comprising, in parts by weight:
a) 100 of at least one ethylenically unsaturated monomer not comprising an ionic group,
b) 0.5 to 15 of at least one ethylenically unsaturated monomer carrying at least one carboxyl and/or carboxylic anhydride functional group,
c) at least one ethylenically unsaturated monomer carrying at least one second functionality selected from: phosphate, phosphonate or phosphinate, in an amount such that the ratio c/(b+c) varies from 0.05 to 0.4,
d) 0 to 2 of at least one ethylenically unsaturated monomer carrying at least one alkoxysilane functional group,
e) 0 to 5 of at least one ethylenically unsaturated monomer additionally carrying at least one active carbonyl functional group or an other aldhehyde-reactive functional group, such as an ureido derivative, or morpholine, imidazoline, oxazolidine, aziridine, or an aldhehyde-reactive amine function,
f) 0 to 10, preferably 2 to 8, of at least one ethylenically unsaturated monomer carrying at least one functional group selected from hydroxyl and primary or secondary amine.

The invention also relates to a preparation process, to a coating composition comprising the said dispersion and to a method of use in coatings for metal or plastic substrates, in particular corrosion-inhibiting coatings for metal substrates.

19 Claims, No Drawings

AQUEOUS POLYMER DISPERSION FOR BARRIER COATING

CROSS REFERENCE TO RELATED APPLICATION

This application claims the benefit of U.S. provisional application Ser. No. 60/565,206 filed on Apr. 23, 2004, pending.

The present invention relates to aqueous polymer dispersions, the polymer preferably being of the styrene-acrylic type, for the preparation of hydrophobic coatings for metal or plastic substrates which protect by a barrier effect; the said coating, the formulation of which exhibits a satisfactory stability, forms a barrier to the diffusion of corrosive agents and for protection against chemical and/or mechanical attacks, characterized by a lasting adhesion.

Increasingly restrictive regulations with regard to the use of volatile organic solvents and concern for producing coatings which do not attack the environment in general are henceforth resulting in the increasing use of coating compositions based on aqueous dispersions of polymers. Furthermore, the protection of substrates as varied as metal or plastics requires the use of coatings based on dispersions exhibiting in particular an excellent compromise in performance in terms of adhesion, of chemical and mechanical resistance and, more particularly in the case of metal coatings, a high resistance to corrosion.

Several solutions are already known in the state of the art and more particularly in the field of aqueous dispersions of polymers for aqueous coatings for the protection of metal substrates. However, these coatings do not achieve the compromise in performance desired by the present invention.

EP 221 498 discloses the use in corrosion-inhibiting coatings of aqueous dispersions of polymers with or without a reduced level of surfactants by virtue of the introduction of a copolymerizable alkyl phosphate comonomer. The said dispersion does not comprise specific functional monomers, like those according to the present invention necessary for the achievement of a satisfactory compromise in performance, in particular in terms of quality of pigment dispersion or of adhesion.

Finally, EP 1 193 298 discloses aqueous dispersions of polymers for glossy corrosion-inhibiting coatings with the presence of strong acid monomers, the said strong acid representing more than 45% by weight of the total of the acids. However, the coatings obtained are inadequate in particular as regards the resistance to salt spray and the stability of the formulation of the coating.

However, none of these documents of the state of the art provides a satisfactory solution to the problem of the protection by pigmented or nonpigmented coatings of substrates as varied as metals and plastics while exhibiting an excellent compromise in performance in terms of stability of the formulation of the coating, in particular the stability of the pigment dispersion, of barrier effect for mechanical and/or chemical protection, and of adhesion.

The present invention overcomes the inadequacies and disadvantages of the coatings of the state of the art by providing, as the core of the present invention, an aqueous polymer dispersion specific for coatings for mechanical and/or chemical protection for substrates as varied as metals and plastics with a better compromise in performance on use.

Thus, the specific aqueous polymer dispersion according to the present invention is particularly suitable for the preparation of pigmented or nonpigmented coatings of a hydrophobic nature for mechanical and/or chemical protection which satisfactorily meet the following needs and requirements:
- a good barrier effect to water and to corrosive agents,
- good chemical resistance to agents such as acids and bases, vegetable or mineral oils and fats, including fuels and organic solvents,
- a good profile of mechanical properties, characterized by a good hardness/flexibility compromise,
- good adhesion to various substrates, more particularly still to metals, after exposure to severe conditions, in particular the exposition to moisture and to corrosive surroundings, the said adhesion providing them with lasting protection,
- a rust-inhibiting effect in the case of application to metal substrates,
- and, finally, good stability of the formulation of the coating as formulated for the application.

The first subject-matter of the present invention is an aqueous polymer dispersion specific in the composition and proportions of the monomers and other compounds involved. This dispersion can be crosslinkable according to its composition during the film-forming stage.

A second subject-matter of the invention is a process for the preparation of the said dispersion.

Another subject-matter according to the invention is a coating composition comprising at least one aqueous polymer dispersion according to the invention.

An additional subject-matter according to the invention is the use of the said dispersions in coating compositions for the protection of metal and/or plastic substrates.

Finally, the last subject-matter of the invention is such substrates coated by at least one coating composition as defined according to the invention.

The first subject-matter of the invention is an aqueous polymer dispersion which can be obtained from a mixture of monomers comprising, in parts by weight:
a) 100 of at least one ethylenically unsaturated monomer not comprising an ionic group,
b) 0.5 to 15, preferably 1 to 10, more preferably 2 to 8 and more preferably still 2 to 7 of at least one ethylenically unsaturated monomer carrying at least one carboxyl and/or carboxylic anhydride functional group,
c) at least one ethylenically unsaturated monomer carrying at least one second functionality selected from: phosphate, phosphonate or phosphinate, in an amount such that the ratio c/(b+c) varies from 0.05 to 0.4, preferably from 0.1 to 0.4 and more preferably from 0.1 to 0.25,
d) 0 to 2, preferably 0.05 to 1.5, of at least one ethylenically unsaturated monomer carrying at least one alkoxysilane functional group,
e) 0 to 5 of at least one ethylenically unsaturated monomer carrying at least one active carbonyl functional group or any other aldhehyde-reactive functional group, such as an ureido derivative, or morpholine, imidazoline, oxazolidine, aziridine, or an aldhehyde-reactive amine function,
f) 0 to 10, preferably 2 to 8, of at least one ethylenically unsaturated monomer carrying at least one functional group selected from hydroxyl and primary or secondary amine or carrying a precursor group of such a functional group.

The type a) ethylenically unsaturated monomer, not comprising an ionic group, can generally be chosen from monomers possessing a hydrophobic nature and more particularly from: styrene and its derivatives comprising vinyltoluenes (ortho-, meta- or para-), α-methylstyrene, tert-butylstyrene, para-butylstyrene, para-decylstyrene, $C_1$ to $C_{18}$ alcohol (meth)acrylic esters, acrylonitrile or vinyl esters, such as those of versatic acid. They are preferably selected from styrene and its derivatives, methyl(meth)acrylate, butyl (meth)acrylate, more particularly n-iso-tert-butyl(meth)acrylate, acrylonitrile or 2-ethylhexyl acrylate.

Mention may be made, as examples of type b) ethylenically unsaturated monomer carrying at least one carboxyl and/or carboxylic anhydride functional group, like the following: (meth)acrylic acid, itaconic acid, fumaric acid, maleic acid, crotonic acid, isocrotonic acid or vinylbenzoic acid and preferably (meth)acrylic acid, maleic acid, fumaric acid or itaconic acid and their anhydrides.

The type c) ethylenically unsaturated monomer carrying at least one second functionality can be a carrier of a functional group of phosphate type, according to the general formula below:

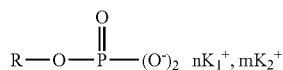

or phosphonate type

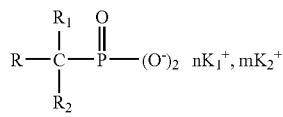

or phosphinate type

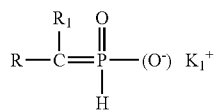

where
R is an organic radical comprising an ethylenic unsaturation, which can be (meth)acrylic acid, vinylic acid or allylic acid. The said organic radical R can also comprise in its structure a polyalkoxylated chain comprising alkoxy units such as oxyethylene (OE) and/or oxypropylene (OP), preferably oxyethylene (OE) and with a number of alkoxy units ranging from 1 to 30, and preferably from 1 to 10,
$R_1$ and $R_2$ which can be H or $C_1$-$C_2$ alkyl,
$K_1^+$ and $K_2^+$ are an $H^+$ or a metallic cation alkaline earth metal and n and m are each equal to 0, 1 or 2, such as n+m=2.

More particular monomers of type c) can be selected from alkyl and alkoxylated(meth)acrylates carrying a terminal phosphate group, which is preferably a mixture of monoester and diester with a predominance in monoester, with the number of alkoxy units and the nature of alkoxy units such as defined above for the radical R, alkyl phosphate(meth)acrylate monoester, preferably the ethyl phosphate methacrylate, polyoxyalkylene(meth)acrylates, preferably the (2-methacryloxy)ethyl phosphoric monoester and the (methacryloxy)polyoxyethylene phosphoric monoester with 1 to 10 ethoxy units.

The aqueous dispersion composition can comprise up to 2, preferably 0.1 to 1.5, parts per 100 parts of a) of at least one ethylenically unsaturated monomer d) carrying at least one hydrolysable alkoxysilane functional group. This monomer is added during the polymerization and is chosen from meth-acryloxy-silanated derivatives, such as γ-methacryloxypropyl-: -trimethoxysilane, or -triisopropoxysilane, or -triethoxysilane.

The aqueous dispersion according to the invention can be crosslinkable by selective reactions favoured during the step of film-formation. In such a case, it can also comprise 0 to 5 parts by weight of at least a polyfunctional compound carrying at least 2 hydrazide or amine or aldehyde functional groups added after the preparation by emulsion polymerization of the said dispersion. Such a compound of hydrazide type can be obtained by reaction of a carboxylic polyacid with hydrazine and is preferably of adipic acid bishydrazide type.

Likewise, the aqueous dispersion composition can optionally comprise, in addition to that, at least one compound e) carrying at least one active carbonyl functional group or any other aldehyde-reactive functional group, such as an ureido derivative, or morpholine, imidazoline, oxazolidine, aziridine, or an aldhehyde-reactive amine function. The active carbonyl functional group is defined as a carbonyl functional group of non-enolic ketone or aldehyde type, such as is present in (meth-)acrolein, methyl vinyl ketone and diacetone acrylamide, or of enolic ketone or aldehyde type, as in acetoacetoxy alkyl(meth)acrylates or (meth)acrylamides or acetoacetamidoalkyl(meth)acrylates or (meth)acrylamides, such as, for example, acetoacetoxyethyl(meth)acrylate and acetoacetoxyamidoethyl methacrylate. The compound e) carrying at least one active carbonyl functional group or an other aldhehyde-reactive functional group is preferably chosen from diacetone acrylamide (DAAM) and acetoacetoxyethyl methacrylate (MAAE). The said aldhehyde-reactive functional groups are defined in US 2004/0198903A1 in §11. The compound e) consists of, besides the MAAE compounds, ureido derivatives, such as the 2-ethylene-ureidoethyl methacrylate or morpholine, imidazoline, oxazolidine, aziridine derivatives, or an aldhehyde-reactive amine function, such as the dimethylaminoethyl methacrylate.

The presence of the compound e) carrying at least one active carbonyl functional group or any aldehyde-reactive functional group, in a composition already comprising the polyfunctional compound mentioned above, may contribute to the adhesion properties of the film to various substrates. The presence of the compound e) can also conduct to a reaction with a hydrosoluble or hydrodispersible polyfunctional compound carrying at least 2 hydrazide or amine or aldehyde functions, the said polyfunctional compound will be added to the polymeric dispersion during or after the polymerization. This reaction favoured during the film-forming step, makes possible crosslinking of the polymers of the dispersion, thus improving the chemical resistance, the mechanical strength, and the protective properties of the coatings. The hydrazide compound can be obtained by reacting hydrazine with a carboxylic polyacid, and is preferably bishydrazide adipic acid type.

Likewise, the presence in the mixture of monomers of the dispersion of an ethylenically unsaturated monomer f) carrying a hydroxyl functional group or a primary or secondary amine functional group or a precursor group of such a functional group can make possible the crosslinking of the coating film during drying by addition of other functional reactive compounds of polyisocyanate, melamine-formaldehyde resin, (poly)epoxy or polyfunctional alkoxysilane type, such as an epoxyalkoxysilane. The external crosslinking can also be introduced by a polyaziridine or a carbodiimide which also reacts with the carboxyl groups present in the polymer in dispersion. These coreactive compounds are generally introduced into the coating composition during its preparation or immediately before use.

Mention may be made, among the preferred ethylenically unsaturated monomers, of tert-butylaminoethyl methacrylate (TBAEMA) and hydroxyalkyl(meth)acrylates, preferably with $C_2$-$C_4$ alkyl, such as 2-hydroxyethyl methacrylate (HEMA).

The alkoxysilane additives comprise at least one hydrolysable Si—O—C group and one Si—O—X group, where X carries an organic group which reacts with a functional group present on the polymer of the said dispersion, preferably an epoxy or amino group. Mention will be made, among epoxysilanes, of γ-glycidoxypropyltrimethoxysilane and β-(3,4-epoxycyclohexyl)ethyltrimethoxysilane and, among aminosilanes, of bis [γ-(trimethoxysilyl)propyl]amine, [N-(β-aminoethyl)-γ-aminopropyl]methyldimethoxysilane, [N-phenyl-γ-aminopropyl]trimethoxysilane, (γ-aminopropyl)trimethoxysilane, aqueous solutions of aminoalkylsilicone, (γ-aminopropyl)trimethoxysilane, [N-(β-aminoethyl)-γ-aminopropyl]trimethoxysilane or organofunctional triaminosilane. These additives can be added either after the polymerization and the cooling of the dispersion or during the preparation of the coating composition.

The polymerization of the aqueous dispersion can be carried out according to a semicontinuous emulsion process known to a person skilled in the art. Various starting materials present in the composition, such as at least one standard radical polymerization initiator and at least one surfactant, are also involved during the reaction.

The surfactant can be of anionic or nonionic type or else a combination of at least one anionic surfactant and at least one nonionic surfactant. It is preferably present at an overall level ranging from 0.5 to 5 and more preferably from 1 to 3 parts per 100 parts of a). The said surfactant can comprise an α,β-ethylenic unsaturation rendering it copolymerizable with the monomers a), b), c), d), e) and f).

The anionic surfactants are selected from sulphates, ether sulphates, sulphonates or phosphates of alkoxylated fatty alcohols. Likewise, the nonionic surfactants are selected from ethoxylated fatty alcohols, ethoxylated alkylphenol derivatives or copolymers of ethylene oxide and of propylene oxide. The surfactants can also be a combination of at least one anionic surfactant and of at least one nonionic surfactant as described above.

The preferred anionic surfactants are chosen from alkyl alkoxylated phosphates where the alkoxy units are of ethoxy and/or propoxy type with the following typical structure:

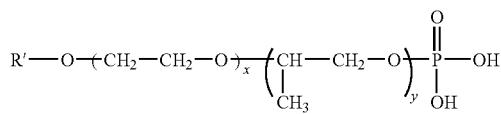

The R' group can be the alkyl residue of a fatty alcohol which can comprise an α,β-ethylenic unsaturation with a chain which can be linear or branched. It comprises a distribution of hydrocarbonaceous chain for which the carbon number can vary from 8 to 18.

R' is preferably the residue of a saturated fatty alcohol comprising a carbon number ranging from 12 to 14.

The preferred surfactants are polyether ester phosphate alkoxylated alkyl type with R' in $C_{12}$, $C_{13}$ or $C_{14}$, the said alkoxy being an oxyethylene.

The R' group can also be a derivative of ethoxylated alkylphenol type, generally ethoxylated nonyl- or octylphenol.

The alkoxylated group can be either of polyoxyethylene type (x units), polyoxypropylene type (y units) or a copolymer comprising a polyoxyethylene block and a polyoxypropylene block, such as the Pluronic diblock or triblock polymeric surfactants sold by BASF.

x is comprised between 0 and 50.

y is comprised between 0 and 50.

y/(x+y) is comprised between 0 and 1.

The level of surfactant in the composition of the dispersion can vary from 0.5 to 5 parts by weight with respect to 100 parts of a) and preferably from 1 to 3 parts by weight. It determines, inter alia, the size of the particles of the dispersion.

Within this range of levels, the size of the particles varies from 50 to 200 nm, preferably from 70 to 200 nm and more preferably from 80 to 120 nm.

The degree of neutralization of the two acid functional groups of the phosphate group of the surfactants is adjusted before and during the synthesis by virtue of the control of the pH. The polymerizations are preferably carried out between pH=2.5 and 9, so that at least one of the acid functional groups of the phosphate group is partially neutralized.

The agent for neutralization of the phosphate functional groups is a base chosen from potassium hydroxide, sodium hydroxide, ammonium hydroxide, potassium carbonate, sodium carbonate, ammonium carbonate, potassium hydrogencarbonate, sodium hydrogencarbonate, ammonium hydrogencarbonate, amines or alcohol amines. The preferred bases are volatile amines, such as ammonia, or neutralizing agents which decompose without leaving inorganic residues which are sensitive to water after the stage of drying the paint film, such as ammonium carbonate.

The polymerization initiators are radical polymerization initiators which are preferably soluble in water, such as sodium persulphate, potassium persulphate or ammonium persulphate, used alone or in the presence of reducing agents, such as sodium metabisulphites or hydrosulphites, sodium dithionite, sodium thiosulphate, sodium formaldehydesulphoxylate, a mixture of disodium salt of 2-hydroxy-2-sulphinoacid, of sodium sulphite and of disodium salt of 2-hydroxy-2-sulphoacid, or a mixture of disodium salt of hydroxysulphinoacetic acid and of disodium salt of hydroxysulphoacetic acid, sold respectively under the names of Bruggolite FF6 and Bruggolite FF7 by Bruggemann.

Fat-soluble or partially fat-soluble radical polymerization initiators can also be used. These initiators will include peroxides or hydroperoxides and azobisisobutyronitrile derivatives. The peroxides or hydroperoxides are used in combination with the reducing agents described above, so as to lower their activation temperature.

According to an alternative form of the invention, the said dispersion comprises at least 2 distinct polymers with different corresponding Tg values:
 either in the form of blends of distinct polymer particles,
 or in the form of structured particles composed of at least 2 distinct polymer phases.

According to another preferred alternative form of the said dispersion, still according to the invention, the said particles of the polymer dispersion are structured according to a core/shell structure and with at least one of the monomers b) or c) or d) or e) or f) predominantly present in one of the said phases. Thus, they can be found predominantly in the shell or in the core of the particle, depending upon the final function and application desired.

Another specific possibility according to the invention is a dispersion which can be obtained:
- either by blending at least 2 dispersions of polymers with distinct functionalities and Tg values,
- or, in the case of structured particles, by a polymerization process comprising at least two successive stages with distinct monomer compositions.

The second subject-matter of the invention relates to a specific preparation process for the aqueous dispersion according to the invention as defined above. In general, this dispersion can be obtained according to a semicontinuous emulsion polymerization process at temperatures which can vary between 60 and 90° C., and preferably between 65° C. and 85° C.

More particularly, the dispersion according to the invention can be obtained by a specific process which can comprise at least the following stages:
i) polymerization of at least one monomer composition as defined according to the invention,
ii) optionally, blending of at least two aqueous dispersions obtained according to stage i), each of these dispersions comprising polymers with different Tg values.

Another alternative form of the specific preparation process comprises at least the following stages:
i) polymerization in at least one stage of a monomer composition as defined according to the invention,
ii) polymerization in at least one stage of at least one second monomer composition as defined according to the invention, it being possible for this second composition to give a polymer with a different Tg value from that of stage i) and/or to comprise at least one of the monomers b) or c) or d) or e) or f) in a predominant proportion in one of the said monomer compositions.

During a first stage, the nucleation of the polymer particles can be carried out in situ by carrying out a discontinuously (batch) introduction of a small proportion of the monomers used for the complete process and of a sufficient amount of a radical initiator or of a seed prepared beforehand. It is also possible to directly initiate the second stage without passing through a nucleation stage.

The second stage consists in running in semicontinuously a solution or a pre-emulsion of monomers and a solution of radical initiator. This second stage can furthermore be subdivided into several substages during the feeding to the reaction medium of a mixture of monomers. The composition of the latter can vary according to whether the objective is to vary the glass transition temperature of the final composition, to optimize the distribution of the functional monomers, such as the strong and weak acid monomers already described and the crosslinking monomers, such as the ethylenically unsaturated monomers carrying alkoxysilane groups, the unsaturated monomers possessing an active carbonyl such as diacetone acrylamide, or the hydroxylated or aminated unsaturated monomers, or else to obtain a low film-forming temperature of the latex in order to reduce the level of coalescent agent in the formulation.

Thus, a film-forming temperature of the latex of less than 20° C. can be obtained during the emulsion polymerization by successively feeding at least two mixtures of monomers A and B with different Tg A and Tg B values corresponding to the following characteristics:

$-50° C. < Tg A < 30° C.$ $-40° C. < Tg B < 130° C.$ where A represents between 45 and 90% of the total monomer composition,
and B represents between 10 and 55% of the total monomer composition.

A can be fed before B or vice versa, according to the particle structure desired.

Likewise, in order to obtain the best compromise between hydrophobicity or resistance to water and formulatability of typical formulations for corrosion-inhibiting applications, it may be advantageous to optimize the effectiveness of the functional monomers. Thus, it is possible to choose to introduce the crosslinking monomers, such as diacetone acrylamide, or the silanes at the beginning of the running in of monomers in order to concentrate them at the core of the particles. On the other hand, to ensure good pigment dispersion, it may be advantageous to introduce these monomers at the end of the feeding of monomers, so as to concentrate them at the surface of the particles.

The third stage of the process relates to the reduction of the residual monomers in the final composition. This is achieved by semi continuously feeding in various solutions of radical initiators in the presence or absence of activator which are reducing agents as described above.

The reaction mixture is subsequently cooled during the final stage of the process. When it reaches a temperature of less than 40° C., it is neutralized to pH>7 using a neutralizing agent. The neutralizing agent is a base chosen from potassium hydroxide, sodium hydroxide, ammonium hydroxide, amines or alcohol amines. The preferred bases are volatile amines, such as monoethylamine, triethylamine and, preferably, ammonia.

After cooling, the additives of hydrazide, amine, aldehyde or alkoxysilane type are also added, if appropriate. These additives are introduced according to a specific process: this is because they are emulsified beforehand in water by virtue of a surfactant system analogous to that used during the polymerization.

Another subject-matter of the invention is a coating composition comprising at least one aqueous dispersion according to the invention. This composition can be pigmented or non pigmented of primer and/or finish type comprising the dispersion of the invention. This coating composition can be obtained from a monomer mixture according to the invention and additionally comprises up to 10 parts of at least one functional ethylenically unsaturated monomer f), the coating composition additionally comprising a compound which reacts with the functional groups of the said functional monomer. The said coating is a protective coating for metal or plastic substrates or an adhesion primer or a corrosion-inhibiting primer or corrosion-inhibiting paint coating. More particularly, the said coating is a coating which can be applied in at least one coat and preferably a pigmented coating.

The coating can be formulated from a single-component dispersion as defined by the invention. Thus, in some cases, the ethylenically unsaturated monomers carrying at least one active carbonyl functional group and more particularly the monomers of diacetone acrylamide or acetoacetoxyethyl methacrylate type can crosslink with compounds of adipic acid bishydrazide and/or diamine and/or bisaldehyde type also present in the latex.

Likewise, during its preparation, the coating composition can also form the subject of the addition of compounds of polyisocyanate, melamine, epoxysilane, aminosilane, epoxy, polyaziridine or carbodiimide type capable of crosslinking with the groups of the functional monomers of type f) introduced beforehand during the synthesis of the dispersion and chosen from hydroxylated or aminated ethylenically unsaturated monomers, such as $C_2$-$C_4$ hydroxyalkyl(meth)acrylates, preferably 2-hydroxyethyl methacrylate (HEMA) and tert-butylaminoethyl methacrylate (TBAEMA), or with the carboxyl groups of the monomers of type b), the residual carboxyl groups according to b) being, in this case, in proportions such that the essential conditions of the invention relating to the components b), c) and the c/b+c ratio continue to be observed.

The reactions are then preferably of aminated unsaturated monomer/carbodiimide, hydroxylated unsaturated monomer/melamine or polyisocyanate type.

An additional subject-matter of the invention is the use of the dispersion of the invention, and more particularly the method of use of the dispersion of the invention, as protective coating for metal or plastic substrates or an adhesion primer or corrosion-inhibiting primer or corrosion-inhibiting paint coating and more preferably as coating for the corrosion-inhibiting protection of metal substrates. The coating on metal or plastic substrates can be produced in one or more coats and can be pigmented or nonpigmented.

The thickness of a coating coat can generally vary from 10 to 150 microns and preferably from 20 to 120 microns, when dry.

Another specific possibility according to the invention is a coating composition comprising the said dispersion which is obtained from a monomer mixture as defined according to the invention and which additionally comprises up to 10 parts by weight of at least one functional ethylenically unsaturated monomer as defined according to f) and which additionally comprises a compound which reacts with the functional groups of the said functional monomer f). A particular case of nonpigmented coating is a varnish for the protection of plastic substrates, with good adhesion and gloss performances.

A final subject-matter of the present invention is a metal or plastic substrate coated with at least one coat of at least one coating composition as defined according to the invention. More particularly, the coated substrates are metal substrates.

This is because, with the prospect of ever more restrictive regulations in the field of VOC emissions, the development of aqueous technology is experiencing increasing success in the coating of metal and plastics. Thus, the dispersions, in particular of styrene-acrylic type, according to the invention are used in pigmented or nonpigmented coating compositions which can be applied in at least one coat, preferably one or two or three or even up to four coats of 10 to 150 μm dry per coat, as primer and/or as finish, to a substrate exposed to moderate operating conditions. The use of these coating compositions relates in particular to the market of the coating of components of the electromechanical engineering industry, of transportation and construction equipment, or of building site or agricultural machines, where components of different natures have to be painted, and to the protection on building sites or in workshops of metal structures.

By way of illustration of the invention, the following examples demonstrate, without any limitation, the performances of the dispersions and coatings obtained.

I/Starting Materials:

a) Starting materials participating in the composition of the latex:

| Compound | Chemical nature |
|---|---|
| Monomers | |
| ST (Atofina) | Styrene |
| MMA (Atofina) | Methyl methacrylate |
| BMA (Atofina) | Butyl Methyl methacrylate |
| 2EHA (Atofina) | 2-Ethylhexyl acrylate |
| (M)AA (Atofina) | (Meth)acrylic acid |
| AN | Acrylonitrile |
| DAAM (DSM) | Diacetone acrylamide |
| Sipomer PAM 100 (Rhodia) | Phosphoethyl ethoxylated methacrylate |
| Polysurf HP (ADDP Polysurf) | Phosphoethyl methacrylate |
| Initiators | |
| $Na_2S_2O_8$ | Sodium persulphate |
| TBHP | t-Butyl hydroperoxide |
| Activators | |
| SFS | Na formaldehydesulphoxylate |
| Additives | |
| Rhodafac RS 610 (Rhodia) | Anionic surfactant: alkyl phosphate ethoxylated (6OE), of formula $C_{13}H_{27}$—(O—$CH_2$—$CH_2$—)$_6$—O—P(O)(OH)$_2$ in solution at 25% neutralized to pH = 7 |
| Disponil A 3065 (Cognis) | Nonionic surfactant: $C_{12}$–$C_{14}$ fatty alcohol/EO: 30 |
| Various | |
| Acticide LA (Thor) | Biocide |
| AABH (DSM) | Adipic acid bishydrazide (8% solution in water) | b) Starting materials participating in the formulation of the primer:

| Constituent | Function | Chemical nature | Supplier |
|---|---|---|---|
| Kathon LXE | Biocide | Methyl- and chloroisothiazolinone | Röhm & Haas (USA) |
| Byk 151 | Pigment dispersant | Alkylammonium salt of a polyfunctional polymer in solution | Byk (Ge) |
| Surfynol 104PG | Wetting agent | Octynediol in solution in PG | Air Products |
| Tiona RCL 535 | Pigment | Titanium dioxide | Millenium (UK) |
| Heucophos ZCPP | Anticorrosive active pigment | Mixed Zn and Ca phosphoaluminosilicate | Heubach (Ge) |
| Plastorit micro | Filler | Natural combination of mica and of quartz | Luzenac-Naintsch |
| Byk 024 | Antifoaming additive | Silicone product | Byk |
| Emadox NA | Additive for inhibiting flash rusting | Sodium nitrite solution | Labema (Fr) |
| Texanol | Coalescent agent | Trimethylpentanediol isobutyrate | Eastman (USA) |
| Aquaflow NLS 200 | Nonionic associative thickener | Hydrophobic-modified polyolpolyether | Hercules-Aqualon |
| Acrysol RM2020 | Nonionic associative thickener | Hydrophobic-modified polyurethanepolyether | Röhm & Haas |
| Tego Foamex 7447 | Defoaming agent | Silicone compound | Degussa-Tego |

II/Composition and Use of the Latexes:

EXAMPLE IA

A vessel heel containing 79 parts of water and 1.30 parts of Rhodafac® RS 610 (Rhodia), with a solids content of 25%, neutralized beforehand to pH=9-10 with 28% aqueous ammonia, is heated to 85° C.

Seeding is carried out at 85° C. using 5% of a pre-emulsion neutralized to pH=4.5 with aqueous ammonia and composed of 33 parts of water, 1.50 parts of Rhodafac RS 610 (SC: 25%), 25 parts of butyl methacrylate (BMA), 52 parts of styrene (ST), 19 parts of 2-ethylhexyl acrylate, 3 parts of acrylic acid and 1 part of PAM 100 (phosphoethoxyethyl methacrylate), and 20% of an initiator solution containing 7 parts of water and 0.40 part of sodium persulphate $Na_2S_2O_8$.

The reaction medium is left stirring and heating for 5 min and then the remainder of the pre-emulsion (95%) and of the sodium persulphate solution are run in in parallel over 4 h and 4 h 30 respectively. The medium is subsequently cooled to 65° C.

A stage of reduction of the residual monomers is subsequently carried out by running in, in parallel and over 30 min, a solution containing 1 part of water and 0.05 part of $(CH_3)_3COOH$ (SC: 70%) and a solution containing 1 part of water per 0.04 part of $HOCH_2SO_2Na.2H_2O$ (SC: 76.6%) (sodium formaldehydesulphoxylate).

Postadditions: gradual addition and under stirring of an aqueous solution of Disponil A3065 (1/1 in water) with 1% of active Disponil A3065/dried polymer, rinsing and keeping stirred at the temperature of the reaction, during 30 to 45 minutes.

Neutralization with $NH_4OH$ after cooling to 30° C.

Addition of biocide at ambient temperature.

EXAMPLE IB

Counterexample

Same process as for Example Ia, the amounts of acrylic acid and of PAM 100 respectively being adjusted to 2 parts by weight.

EXAMPLES IIA TO IVC

Same process as for Example Ia with, nevertheless, variations in amounts and in nature of monomers and comonomer, in the amounts of acrylic acid and PAM 100 or PEM (phosphoethyl methacrylate), and possible postmodifications (cf. Table I). Likewise, the addition of adipic acid bishydrazide in Examples IIa and IId is carried out at the end of the process, after neutralization with $NH_4OH$. In contrast, the diacetone acrylamide of Example IIa is introduced after the monomers have finished being fed in.

Examples IIc, IIIc, IVb and IVc are outside the invention.

EXAMPLE V

Test carried out according to: Example 3: Polymer Sample 7 of EP 1 193 298 A1, pages 7 and 8 (cf. Table I).

III/Implementation of and Tests on the Films:

1/ Metal Primer, DTM TC Finishes and Varnishes:

Hereunder are the formulations respectively of the metal primer a), the finish DTM TC b) ("direct to metal top coat") and the varnish c), on which the evaluation tests were carried out.

| | Formulation | | |
|---|---|---|---|
| Constituents | a) Primer Amounts by weight (g) | b) Finish DTM TC Amounts by weight (g) | c) Varnish Amounts by weight (g) |
| Latex (45% of dry extract) | — | | 888.9 |
| Pigment dispersion | | | 0 |
| Water | 100.1 | 58.3 | — |
| Kathon LXE | 1.4 | 0.2 | — |
| Byk 151 | 6.6 | 6.9 | — |
| Surfynol 104 PG 50 | 2.4 | — | — |
| TEGO LA-W1006 | — | 2.0 | 4.5 |
| Butyl glycol ether | — | 19.8 | 44.4 |
| Ammonia à 20% | 1.0 | 0.9 | — |
| Tiona RCL 535 | 79.9 | 242.0 | — |
| Heucophos ZCPP | 60.7 | — | — |
| Plastorit MICRO | 109.2 | — | — |
| BYK 024 | 1.0 | 1.0 | — |
| EMADOX NA | 3.5 | 3.6 | — |
| Addition under moderated stirring | | | |
| Latex (45% of dry extract) | 574.9 | 610.2 | — |
| Texanol | 31.8 | 25.7 | 62.2 |
| Aquaflow NLS 200 | 1.5 | — | — |
| Acrysol RM-2020 | 4.5 | 5.2 | — |
| Byk 024 | 1.0 | 1.0 | — |
| Tego Foamex 7447 | 1.0 | 1.0 | — |
| Water | 19.5 | 22.2 | — |

| Characteristics | Primer | Finish DTM TC | Varnish |
|---|---|---|---|
| Specific gravity | 1.24 | 1.26 | |
| Weight solid content (%) | 51.74 | 52.6 | |
| Volume solid content (%) | 40.0 | 40.0 | |

| Characteristics of the film | Primer | Finish DTM TC | Varnish |
|---|---|---|---|
| Specific gravity | 1.60 | 1.65 | |
| PVC (with adjuvant) | 24.41 | 18.5 | 0 |
| PVC (without adjuvant) | 25.00 | 19.0 | 0 |

2/ Application of and Tests on the Coatings:

2/a Primers on Metal

Hiding power RY: The quality of the pigment dispersion is assessed on the basis of the opacity of the film applied to a 2A white/black Leneta chart. The hiding power RY is the contrast ratio RY calculated from the values of Y measured respectively on the paint film, applied at 150 μm wet film thickness, onto the black and onto the white part of the Leneta chart, i.e. percent Y of film applied onto black part divided by percent Y of film onto white part.

Resistance in the continuous salt spray: the primer film is applied at approximately 75 μm dry film thickness onto panels of depolished cold-rolled steel with mat surface reference Q-Panel S36 (Labomat). After drying at room temperature for 4 days and at 50° C. for 72 hours, the test specimens are stored for 24 hours at 23° C. and 50% relative humidity and are then subjected to accelerated ageing for 240 h in the salt spray cabinet according to NF ISO 9227 standard test method.

Blistering and rusting are assessed on both 2 distinct zones of the test panel
on the unnotched zone of the panel: evaluation of the degree of blistering according to ISO 4628/2, evaluation of the degree of rusting according to ISO 4628/3,
in the cross-notched zone of the panel, the extension of corrosion creeping alongside the notch is assessed on basis of both:
the width of the rust strip, measured from the notch (mm),
the width of the zone raised by the blistering, measured from the notch (mm).

After 2 h storage at 23° C. under 50% relative humidity for, the adhesion of the film onto the substrate is tested according to ISO 2409 on the unnotched region by cutting a right-angle lattice pattern and pulling off the adhesive tape 3M 610 ("cross-hatch and pull" test). The adhesion of the film on the cross-notched part of the panel is assessed with the adhesive tape applied directly onto and pulled off the notch.

The results obtained on primers are presented in Tables II/a.

2/b Gloss Finishes "DTM TC"

The latex formulated at CPV=19 according to the gloss paint formulation 1/b are subjected to the following tests:

Gloss: The films are applied at 200 µm, wet, onto glass and after one week drying at 25° C. and 50% relative humidity, their gloss is measured with the Micro-Tri-Gloss-meter of Byk-Gardner.

Resistance in the continuous salt spray: the paints are evaluated in 2 different systems:
1-coat "DTM TC" system ("direct to metal top coat" system) the paints are applied directly onto the Q-Panels S36 metal plate at approximately 50 µm dry film thickness (see 2/a),
2-coats "PR+TC" system ("primer+top coat" system): after 24 h drying, the finishing paints are applied at approximately 30 µm on top of a 50 µm primer layer applied onto Q-Panel S36, the primer itself being formulated with the latex of the example IId of Table I.

The test panels are dried, stored, subjected to accelerated ageing and evaluated as described above for the primers.

The results obtained on finishing coats are presented in Table II/b.

2/c Varnishes

The varnish formulated with the latex of example IIId is diluted with water to 31 seconds CF4 (Ford Cup 4) viscosity and a weight solid content of 39%. The varnish is applied with a bar coater at 50 µm wet film thickness onto a 80 µm-thin cristal-clear and Corona-treated polypropylene (PP) film or a High-Impact polystyrene (HIPS) laminated plates.

After 15 minutes of flash-off at room temperature, the films are dried in the oven for 30 minutes at 50° C. and then stored for 60 h at 23° C. and 50% relative humidity before testing.

The film is clear and regular, with HB pencil hardness rating.

The applied film is flexible and adheres on PP: It resists a double tight cross-folding inwards of the coated polypropylene (PP) sheet without crease nor adhesion loss. It also adheres on HIPS and passes the "square-hatch and pull" test using the adhesive tape 3M 610.

Blocking test: 2 films are pressed face to face at a given temperature and pressure; after a given time, they are pulled apart and the damages to the film are assessed. The result is rated on a scale 1 to 5, where 5 indicates no stickiness at all, whereas 1 means that the films adhere to each other in such an extent that they are severely damaged when separated.
Blocking after 16 h at 23° C. under 50% relative humidity and P=1 kg/cm$^2$: the score on the scale is 5, which means no sticking at all
Blocking after 72 h at 60° C. under 70% relative humidity and P=0.5 kg/cm$^2$: the score is 1 on the scale which means that the 2 films adhere on each other at such an extent that they are severely deteriorated when pulled apart.

The film resists to chemical agents:
100% Ethanol spot test on PP: the film resists 30 minutes, but is stained after longer contact time. Ethanol 100% rub test on HIPS: the film is only superficially marked by 10 double rubs of a solvent soaked felt under 0.5 kg/cm$^2$.
Concentrated solution of industrial detergent (spot test): the film remains unmarked after 24 h contact with Teepol and screen washer
Hand cream: The film resists 7 h but is marked after a longer contact with Nivea cream.

3/ Comments on the Results:

3/a Primers on Metal

The results presented in Table II illustrate the need for the polymers to comprise a sufficient level of acid, predominately carboxylic acid, to achieve a satisfactory compromise in performances, in particular the pigment dispersion and the stability of the formulation. This level is determined by the hydrophobicity of the comonomers and by the PVC of the coating. The introduction of a covalent crosslinking system in Example IIa improves the protective effect of the coating.

3/b DTM TC Finishes

The latexes of the invention, used in a glossy paint formulation applied direct to metal (DTM TC system) or as finish on top coat (PR+TC system) of a water borne primer, resist better to corrosion than a commercial standard latex, intended for the metal application and referred to as BM (Bench Mark) in Table IIb, and also than the latexes of homologous compositions, whose relative ratio of strong acid (c/b+c) is higher than 0.4.

3/c Varnishes

The latex IIId achieves in varnish formulation a good level of performances as well on metal as on plastic.

TABLE I

| | | | | Composition | | | | | | Parameters | | Characteristics | | | | |
|---|---|---|---|---|---|---|---|---|---|---|---|---|---|---|---|---|
| | | | | | | AA or MAA* | PAM 100 or Polysurf HP** | | AABH, | | | SC | ø | | MFT | Tg |
| Ex. | ST | MMA | AN | BMA | 2EHA | | | DAAM | Postadded | b + c | c/(b + c) | (%) | (nm) | pH | (° C.) | (° C.) |
| Ia | 52 | | 25 | 19 | 3 | 1 | | | | 4 | 0.25 | 44.1 | 89 | 8.5 | 41 | 31 |
| Ib | 52 | | 25 | 19 | 2 | 2 | | | | 4 | 0.50 | 45.2 | 75 | 8.5 | 40 | 30 |
| IIa | 9 | | 25 | 19 | 4 | 1 | | 2 | 1.6 | 5 | 0.20 | 45.5 | 79 | 8.0 | 42 | 34 |
| IIb | 51 | | 25 | 19 | 4 | 1 | | | | 5 | 0.20 | 45.4 | 81 | 8.1 | 45 | 30 |
| IIc | 51 | | 25 | 19 | 1.5 | 3.5 | | | | 5 | 0.70 | 44.6 | 72 | 8.1 | 41 | 30 |

TABLE I-continued

|  | Composition | | | | | | | | | Parameters | | Characteristics | | | | |
| --- | --- | --- | --- | --- | --- | --- | --- | --- | --- | --- | --- | --- | --- | --- | --- | --- |
| Ex. | ST | MMA | AN | BMA | 2EHA | AA or MAA* | PAM 100 or Polysurf HP** | DAAM | AABH, Postadded | b + c | c/(b + c) | SC (%) | ø (nm) | pH | MFT (°C.) | Tg (°C.) |
| IId | 51 |  |  | 25 | 19 | 6 | 1 |  | 0.25 | 7 | 0.14 | 44.0 | 87 | 8.2 | 41 | 30 |
| IIe | 51 |  |  | 25 | 19 | 6 | 1 |  |  | 7 | 0.14 | 44.4 | 87 | 8.2 | 41 | 30 |
| IIf | 46 |  |  | 26 | 19 | 7 | 1 |  |  | 8 | 0.12 | 44.5 | 118 | 8.0 | 41 | 31 |
| IIg | 37 | 30 |  |  | 26 | 6 | 1 |  |  | 7 | 0.14 | 44.4 | 100 | 8.0 | 51 | 34 |
| IIIa | 33 |  |  | 51 | 11 | 4* | 1 |  |  | 5 | 0.20 | 44.9 | 95 | 8.0 | 42 | 33 |
| IIIb | 33 |  |  | 51 | 11 | 4 | 1 |  |  | 5 | 0.20 | 44.2 | 155 | 8.2 | 33 | 31 |
| IIIc | 33 |  |  | 51 | 11 | 2* | 3 |  |  | 5 | 0.60 | 45.0 | 95 | 8.2 | 33 | 32 |
| IIId | 32 |  |  | 50 | 10 | 5 | 1 | 2 | 1.6 | 6 | 0.17 | 45.0 | 90 | 7.7 | 44 | 34 |
| IVa | 27 |  | 25 |  | 43 | 4* | 1 |  |  | 5 | 0.20 | 44.2 | 81 | 8.1 | 32 | 3 |
| IVb | 27 |  | 25 |  | 43 | 2.5* | 2.5** |  |  | 5 | 0.50 | 44.1 | 83 | 7.7 | 34 | 2 |
| IVc | 27 |  | 25 |  | 43 | 2.5* | 2.5 |  |  | 5 | 0.50 | 43.7 | 93 | 8.0 | 30 | 2 |
| V | 29.8 | 2.92 | 19.5 |  | 43.9 | 1* | 2.85** |  |  | 3.85 | 0.74 | 47.1 | 108 | 8.3 | 20 | 0 |

SC = solids content
ø = size of the particles
pH = pH of the latex after neutralization
MFT = minimum film-formation temperature TABLE IIa Performances of latexes in primer formulations

|  |  |  |  |  |  | Continuous salt-spray | | | | | |
| --- | --- | --- | --- | --- | --- | --- | --- | --- | --- | --- | --- |
|  |  |  |  |  |  | Unnotched part | | | | On the cross | |
| Examples | b + c | c/(b + c) | Synthesis | Primer stability | Opaqueness RY | Blistering magnitude (0 to 5) | Blistering density (0 to 5) | Rusting (0 to 5) | Adhesion (0 to 5) | Thickness of line of rust (mm) | Blistering (mm) |
| Ia | 4 | 0.25 | G | VM | 90.3 | 0 | 0 | 0 | 3 | 0 | <5 |
| IIa | 5 | 0.20 | VG | VG | 90.9 | 2 | 1 | 0 | 2 | 0.1 | <15 |
| IIb | 5 | 0.20 | VG | VG | 91.5 | 4 | 3 | 2 | 1 | 0.1 | >20 |
| IIc | 5 | 0.70 | VG | VM | 90.1 | 1 | 1 | 0 | 4 | 0 | <5 |
| Ib | 4 | 0.50 | VG | FG | 90.3 | 0 | 0 | 0 | 4 | 0.3 | <3 |
| IId | 7 | 0.14 | VG | G | 91.6 | 0 | 0 | 0 | 5 | 0 | <3 |
| IIe | 7 | 0.14 | VG | VG | 91.4 | 1.5 | 1 | 0 | 5 | 0 | <3 |
| IIf | 8 | 0.12 | G | FG | 91.7 | 1 | 3 | 0 | 4 | 0 | <10 |
| IIg | 7 | 0.14 | FG | G | 92.2 | 2 | 2 | 0 | 5 | 0 | <5 |
| IIIa | 5 | 0.20 | VG | M | 89.9 | 0 | 0 | 0 | 5 | 0.1 | <6 |
| IIIb | 5 | 0.20 | G | VG | 90.4 | 1 | 1 | 0 | 5 | 0 | <4 |
| IIIc | 5 | 0.60 | M-FG | VM | 89.6 | 1.5 | 3 | 1 | 5 | 0.1 | >20 |
| IVa | 5 | 0.20 | VG | G | 92.1 | 0 | 0 | 0 | 0 | 0 | 0 |
| IVb | 5 | 0.50 | G | VG | 92.6 | 3 | 3 | 2 | 0.5 | 0.5 | <5 |
| IVc | 5 | 0.50 | VG | FG | 90.9 | 3.5 | 3 | 1 | 1 | 1.5 | <6 |
| V | 3.85 | 0.74 | G | FG | 92.6 | 2.5 | 5 | 5 | 4 | 1.5 | >20 |

Synthesis and pigment stability: VG = Very Good, G = Good, FG = Fairly Good, M = Mediocre, VM = Very Mediocre
Adhesion according to ISO 2409: 0 = no pulling off 5 = more than 65% of the film pulled off
Blistering magnitude according to ISO 4628/2
Blistering density according to ISO 4628/2
Rusting according to ISO 4628/3

TABLE IIb

Performances of latexes in DTM TC finish and PR + TC formulations

|  |  |  | Continuous salt spray in DTM TC system | | | | | | |
| --- | --- | --- | --- | --- | --- | --- | --- | --- | --- |
|  |  |  | Unnotched part | | | | On the cross | | |
| Examples | b + c | c/(b + c) | Gloss 20° (%) | Blistering magnitude (0 to 5) | Blistering Density (0 to 5) | Rusting (0 to 5) | Adhesion (0 to 5) | Width of rust (mm) | Blistering (mm) |
| Ia | 4 | 0.25 | 46 | 1 | 3 | 0 | 4 | 1 | 10 |
| Ib | 4 | 0.50 | 57 | 2 | 2 | 0 | 5 | 1.5 | 15 |

TABLE IIb-continued

Performances of latexes in DTM TC finish and PR + TC formulations

| | | | | | | | | | |
|---|---|---|---|---|---|---|---|---|---|
| IIIa | 5 | 0.20 | 51 | 0 | 0 | 0 | 4 | 1 | 10 |
| IIIb | 5 | 0.20 | 50 | 1 | 3 | 1 | 5 | 1 | >20 |
| IIIc | 5 | 0.60 | 38 | 2 | 5 | 2 | 5 | 1 | >15 |
| IIId | 6 | 0.17 | 29 | 2 | 3 | 4 | 0 | 0.5 | 10 |
| V | 3.85 | 0.74 | 54 | 5 | 4 | 3 | 5 | 1 | >15 |
| BM | | | 51 | 4 | 5 | 4.5 | 5 | 1 | >15 |

Continuous salt spray in PR + TC system

| | | | | Unnotched part | | | | On the cross | |
|---|---|---|---|---|---|---|---|---|---|
| Examples | b + c | c/(b + c) | Gloss 20° (%) | Blistering magnitude (0 to 5) | Blistering Density (0 to 5) | Rusting (0 to 5) | Adhesion (0 to 5) | Width of rust (mm) | Blistering (mm) |
| Ia | 4 | 0.25 | 46 | 1 | 2 | 0 | 0 | 1 | 2 |
| Ib | 4 | 0.50 | 57 | 0 | 0 | 0 | 0 | 12 | 0 |
| IIIa | 5 | 0.20 | 51 | 0 | 0 | 0 | 0 | 0.2 | 2 |
| IIIb | 5 | 0.20 | 50 | 0 | 0 | 0 | 0 | 1 | 0 |
| IIIc | 5 | 0.60 | 38 | 0 | 0 | 1 | 3 | 1 | 0 |
| IIId | 6 | 0.17 | 29 | 1 | 1 | 0 | 0 | 0.5 | 10 |
| V | 3.85 | 0.74 | 54 | 0 | 0 | 0 | 5: adhesion fails at the primer/top coat interface | 1 | 3 |
| BM | | | 51 | 1 | 2 | 0 | 5 | 1 | 3 |

What is claimed is:

1. An aqueous polymer dispersion, wherein the said polymer can be obtained from a mixture of monomers comprising, in parts by weight:
   a) 100 of at least one ethylenically unsaturated monomer not comprising an ionic group,
   b) 0.5 to 15 of at least one ethylenically unsaturated monomer carrying at least one carboxyl and/or carboxylic anhydride functional group,
   c) at least one ethylenically unsaturated monomer carrying at least one second functionality selected from: phosphate, phosphonate or phosphinate, in an amount such that the ratio c/(b+c) varies from 0.05 to 0.4,
   d) 0 to 2 of at least one ethylenically unsaturated monomer carrying at least one alkoxysilane functional group,
   e) 0 to 5 of at least one ethylenically unsaturated monomer carrying at least one active carbonyl functional group or another aldehyde-reactive functional group,
   f) 0 to 10 of at least one ethylenically unsaturated monomer carrying at least one functional group selected from hydroxyl and primary or secondary amine or carrying a precursor group of such a functional group, and
   g) at least one alkoxylated alkyl phosphate anionic surfactant.

2. The dispersion according to claim 1, wherein it additionally comprises 0 to 5 parts by weight of at least one polyfunctional compound carrying at least 2 hydrazide or amine or aldehyde functional groups added after the preparation by emulsion polymerization of the said dispersion.

3. The dispersion according to claim 1, wherein the monomer a) is selected from: styrene and its derivatives, C1 to C18 (meth)acrylic esters, acrylonitrile or vinyl esters.

4. The dispersion according to claim 1, wherein the monomer b) is selected from (meth)acrylic acid, maleic acid, itaconic acid, fumaric acid, vinylbenzoic acid, crotonic acid or isocrotonic acid and/or their anhydrides.

5. The dispersion according to claim 1, wherein the component c) carrying at least one second functionality is carrier of a functional group of phosphate, according to one of the formula below:

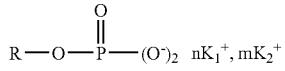

or phosphonate type

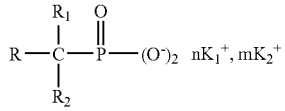

or phosphinate type

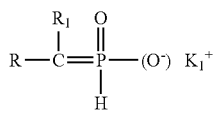

where
R is an organic radical comprising an ethylenic unsaturation, which can be (meth)acrylic acid, vinylic acid or allylic acid, the said organic radical R can comprise in its structure a polyalkoxylated chain comprising alkoxy units with a number of alkoxy units ranging from 1 to 30,
R1 and R2 which can be H or C1-C2 alkyl,
K1+ and K2+ are an H+ or a metallic cation alkaline earth metal, and n and m are each equal to 0, 1 or 2.

6. The dispersion according to claim 1, wherein the said surfactant is at 0.5 to 5 parts per 100 parts of a).

7. The dispersion according to claim 1, wherein the said anionic surfactant is in combination with at least one nonionic surfactant.

8. The dispersion according to claim 6, wherein the said surfactant comprises an α,β-ethylenic unsaturation copolymerizable with the monomers a), b), c), d), e) and f).

9. The dispersion according to claim 7, wherein the said surfactant comprises an α,β-ethylenic unsaturation copolymerizable with the monomers a), b), c), d), e) and f).

10. The dispersion according to claim 1, wherein the said anionic surfactant is a C12, C13 or C14 polyether ester phosphate alkoxylated alkyl surfactant, the said alkyl being in C12, C13 or C14 and the said polyether being an oxyethylene.

11. The dispersion according to claim 1, wherein the said dispersion comprises at least 2 distinct polymers with different Tg values:
   either in the form of blends of distinct polymer particles,
   or in the form of structured particles composed of at least 2 distinct polymer phases.

12. The dispersion according to claim 11, wherein the said particles are structured according to a core/shell structure and that at least one of the monomers b) or c) or d) or e) or f) is present predominantly in one of the said phases.

13. The dispersion according to claim 12, wherein it can be obtained:
   either by blending at least 2 dispersions of polymers with distinct functionalities and Tg values,
   or, in the case of structured particles, by a polymerization process comprising at least two successive stages with distinct monomer compositions.

14. The dispersion according to claim 12, wherein it can be obtained:
   either by blending at least 2 dispersions of polymers with distinct functionalities and Tg values
   or, in the case of structured particles, by a polymerization process comprising at least two successive stages with distinct monomer compositions.

15. The dispersion according to claim 1 wherein the aldhehyde-functional group is an ureido derivative, or morpholine, imidazoline, oxazolidine, aziridine, or an aldhehyde-reactive amine function.

16. The dispersion according to claim 3 wherein the vinyl ester is an ester of versatic acid.

17. The dispersion of claim 5 wherein the alkoxy units are oxyethylene (OE) and/or oxypropylene (OP).

18. The dispersion of claim 5 wherein the alkoxy units are oxyethylene (OE) and/or oxypropylene (OP) with a number of alkoxy units ranging from 1 to 10.

19. The dispersion of claim 5 wherein n+m=2.

* * * * *